(12) United States Patent
Sarcar

(10) Patent No.: US 9,936,003 B1
(45) Date of Patent: Apr. 3, 2018

(54) METHOD AND SYSTEM FOR TRANSMITTING INFORMATION IN A NETWORK

(71) Applicant: QLOGIC, Corporation, Aliso Viejo, CA (US)

(72) Inventor: Kanoj Sarcar, Fremont, CA (US)

(73) Assignee: Cavium, Inc., San Jose, CA (US)

( * ) Notice: Subject to any disclaimer, the term of this patent is extended or adjusted under 35 U.S.C. 154(b) by 743 days.

(21) Appl. No.: 14/473,524

(22) Filed: Aug. 29, 2014

(51) Int. Cl.
*H04L 29/08* (2006.01)
(52) U.S. Cl.
CPC .................................... *H04L 67/10* (2013.01)
(58) Field of Classification Search
CPC ....................................................... H04L 67/10
See application file for complete search history.

(56) References Cited

U.S. PATENT DOCUMENTS 7,076,569 B1* 7/2006 Bailey ..................... H04L 69/12
709/212
8,605,578 B1* 12/2013 Govindaraju ......... H04L 1/1838
370/229
2006/0168086 A1* 7/2006 Kagan ..................... G06F 9/546
709/207
2009/0319701 A1* 12/2009 Mehrotra ............ H04L 67/1097
710/29

* cited by examiner

*Primary Examiner* — Tim T Vo
*Assistant Examiner* — Herve Iradukunda
(74) *Attorney, Agent, or Firm* — Klein, O'Neill & Singh, LLP

(57) ABSTRACT

Methods and systems for transmitting information are provided. A threshold message size is configured to determine when an application executed by a computing system can send a latency message identifying a memory location from where a device can procure a payload for transmission to a destination. The computing system sends a latency message to the device, where the latency message includes the memory location, a transfer size and an indicator indicating if the application wants a completion status after the latency message is processed. The computing system stores connection information at a location dedicated to the application that sends the latency message. The device transmits the payload to the destination; and posts a completion status, where the device posts the completion status at a completion queue associated with the application with information that enables the application to determine whether other latency messages can be posted.

21 Claims, 4 Drawing Sheets

METHOD AND SYSTEM FOR TRANSMITTING INFORMATION IN A NETWORK

TECHNICAL FIELD

The present disclosure relates to computing systems and more particularly, to processing latency messages between a computing system and a device.

BACKGROUND

A computer network, often simply referred to as a network, is a group of interconnected computers and devices that facilitates communication among users and allows users to share resources. Adapters (for example, network interface cards, converged adapters, host bus adapters and others) are typically used during network communication. Continuous efforts are being made to improve network communication.

SUMMARY

The various aspects of the present system and methods have several features, no single one of which is solely responsible for their desirable attributes. Without limiting the scope of the present aspects as expressed by the claims that follow, their more prominent features now will be discussed briefly. After considering this discussion, and particularly after reading the section entitled "Detailed Description" one will understand how the features of the present aspects provide various advantages.

In one aspect, a machine implement method is provided. The method includes configuring a threshold message size to determine when an application executed by a computing system can send a latency message identifying a memory location from where a device can procure a payload for transmission to a destination; sending a latency message to the device, where the latency message includes the memory location, a transfer size and an indicator indicating if the application wants a completion status after the latency message is processed; storing connection information at a location dedicated to the application that sends the latency message; transmitting the payload to the destination; and posting a completion status, if one is requested by the application; wherein the device posts the completion status at a completion queue associated with the application with information that enables the application to determine whether other latency messages can be posted.

In another aspect, a non-transitory, machine readable storage medium storing executable instructions, which when executed by a machine, causes the machine to perform a method is provided. The method includes configuring a threshold message size to determine when an application executed by a computing system can send a latency message identifying a memory location from where a device can procure a payload for transmission to a destination; sending a latency message to the device, where the latency message includes the memory location, a transfer size and an indicator indicating if the application wants a completion status after the latency message is processed; storing connection information at a location dedicated to the application that sends the latency message; transmitting the payload to the destination; and posting a completion status, if one is requested by the application; wherein the device posts the completion status at a completion queue associated with the application with information that enables the application to determine whether other latency messages can be posted.

In yet another aspect, a computing system having a processor for executing instructions out of a memory and interfacing with a device having a device processor executing instructions out of a device memory are provided. A threshold message size is configured to determine when an application executed by the computing system processor can send a latency message identifying a memory location from where the device can procure a payload for transmission to a destination. The computing system sends a latency message to the device, where the latency message includes the memory location, a transfer size and an indicator indicating if the application wants a completion status after the latency message is processed. The computing system also stores connection information at a location dedicated to the application that sends the latency message. The device transmits the payload to the destination; and posts a completion status, if one is requested by the application; where the device posts the completion status at a completion queue associated with the application with information that enables the application to determine whether other latency messages can be posted.

This brief summary has been provided so that the nature of the disclosure may be understood quickly. A more complete understanding of the disclosure can be obtained by reference to the following detailed description of the various aspects thereof concerning the attached drawings.

BRIEF DESCRIPTION OF THE DRAWINGS

The various present aspects relating to selectable initialization for adapters now will be discussed in detail with an emphasis on highlighting the advantageous features. These novel and non-obvious aspects are depicted in the accompanying drawings, which are for illustrative purposes only. These drawings include the following figures, in which like numerals indicate like parts.

DETAILED DESCRIPTION

Figure 1A:
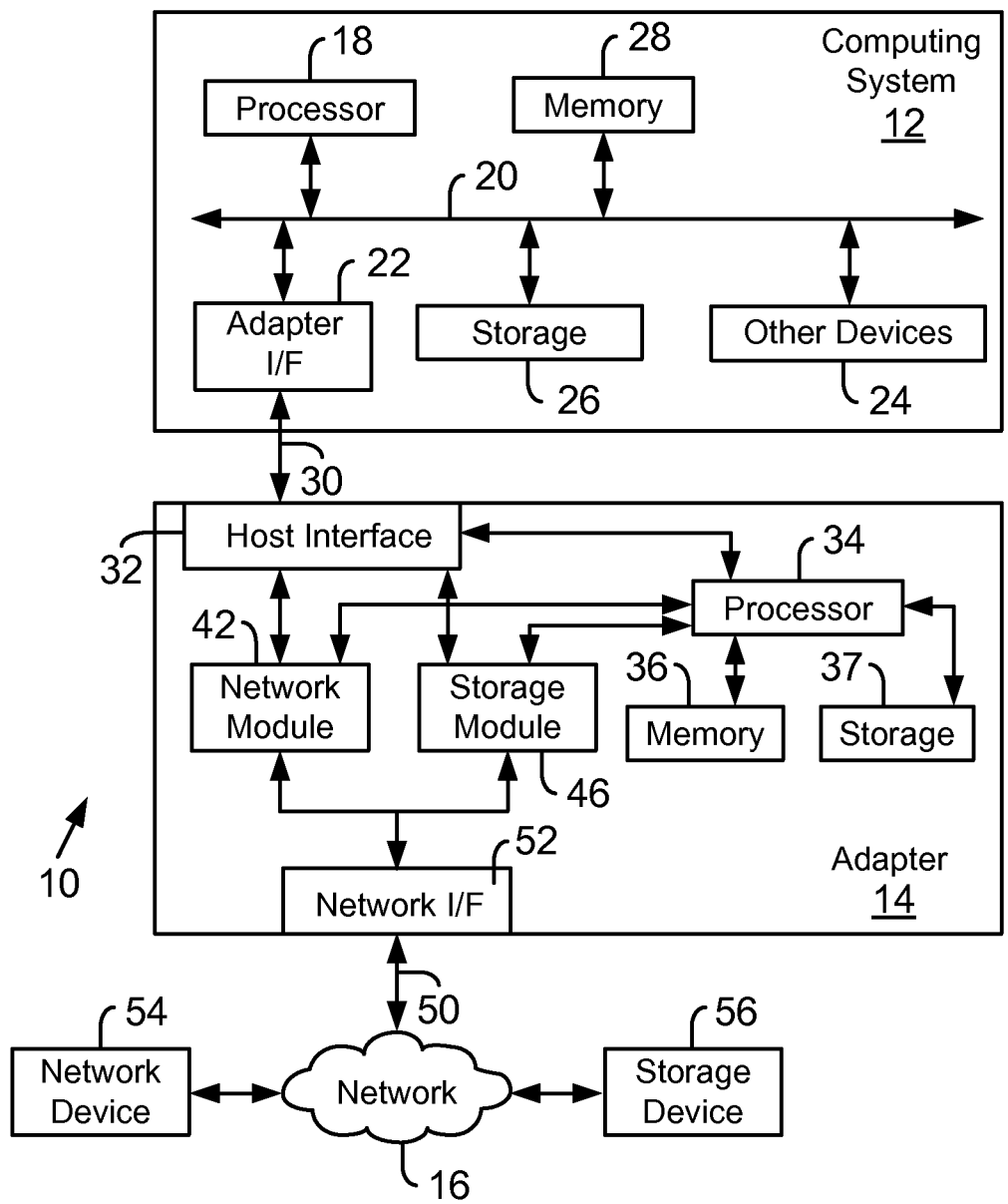
FIG. 1A is a functional block diagram of a computing system coupled to a network through an adapter, used according to one aspect.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of non-transitory, storage devices (magnetic, optical, static, etc.). The aspects disclosed herein, may be implemented as a computer process (method), a computing system, or as an article of manufacture, such as a computer program product or non-transitory, computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Methods and systems for transmitting information are provided. A threshold message size is configured to determine when an application executed by a computing system can send a latency message identifying a memory location from where a device can procure a payload for transmission to a destination. The computing system sends a latency message to the device, where the latency message includes the memory location, a transfer size and an indicator indicating if the application wants a completion status after the latency message is processed. The computing system stores connection information at a location dedicated to the application that sends the latency message. The device transmits the payload to the destination; and posts a completion status, where the device posts the completion status at a completion queue associated with the application with information that enables the application to determine whether other latency messages can be posted.

FIG. 1A is a block diagram of a system 10 configured for use with the present disclosure. System 10 includes a computing system 12 (may also be referred to as "host system 12") coupled to an adapter 14 that interfaces with a network 16 to communicate with a network device 54, a storage device 56 and other devices. The network 16 may include, for example, additional computing systems, servers, storage systems and other devices.

The computing system 12 may include one or more processors 18, also known as a central processing unit (CPU). Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 18 executes computer-executable process steps and interfaces with an interconnect 20, may also be referred to as a computer bus 20. The computer bus 20 may be, for example, a system bus, a Peripheral Component Interconnect (PCI) bus (or PCI Express bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other kind of bus.

An adapter interface 22 enables the computing system 12 to interface with the adapter 14, as described below. The computing system 12 also includes other devices and interfaces 24, which may include a display device interface, a keyboard interface, a pointing device interface, etc. The details of these components are not germane to the inventive aspects of the present disclosure.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, a link 30 and the adapter interface 22 couple the adapter 14 to the computing system 12. The adapter 14 may be configured to handle both network and storage traffic. Various network and storage protocols may be used to handle network and storage traffic, for example, Ethernet, Fibre Channel, Fibre Channel over Ethernet (FCoE), InfiniBand, Remote Direct Memory Access (RDMA), iSCSI and others. The adaptive aspects described herein are not limited to any particular protocol.

The adapter 14 interfaces with the computing system 12 via the link 30 and a host interface 32. In one aspect, the host interface 32 may be a Peripheral Component Interconnect (PCI) Express interface coupled to a PCI Express link. The adapter 14 may also include a processor 34 that executes firmware instructions out of memory 36 to control overall adapter 14 operations.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 that interfaces with network 16 via a network interface 52 and link 50 for handling network traffic. In one aspect, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56. The storage module 46 may further include memory buffers (not shown) to temporarily store information received from the storage devices 56 and transmitted by the adapter 14 to the storage devices 56. In one aspect, the storage module 46 is configured to process storage traffic according to the Fibre Channel storage protocol, or any other protocol.

The adapter 14 also includes a network interface 52 that interfaces with a link 50 via one or more ports (not shown). The network interface 52 includes logic and circuitry to receive information via the link 52 and pass it to either the network module 42 or the storage module 46. Link 50 is used to communicate with storage device 56 and 54 via network 16.

Figure 1B:
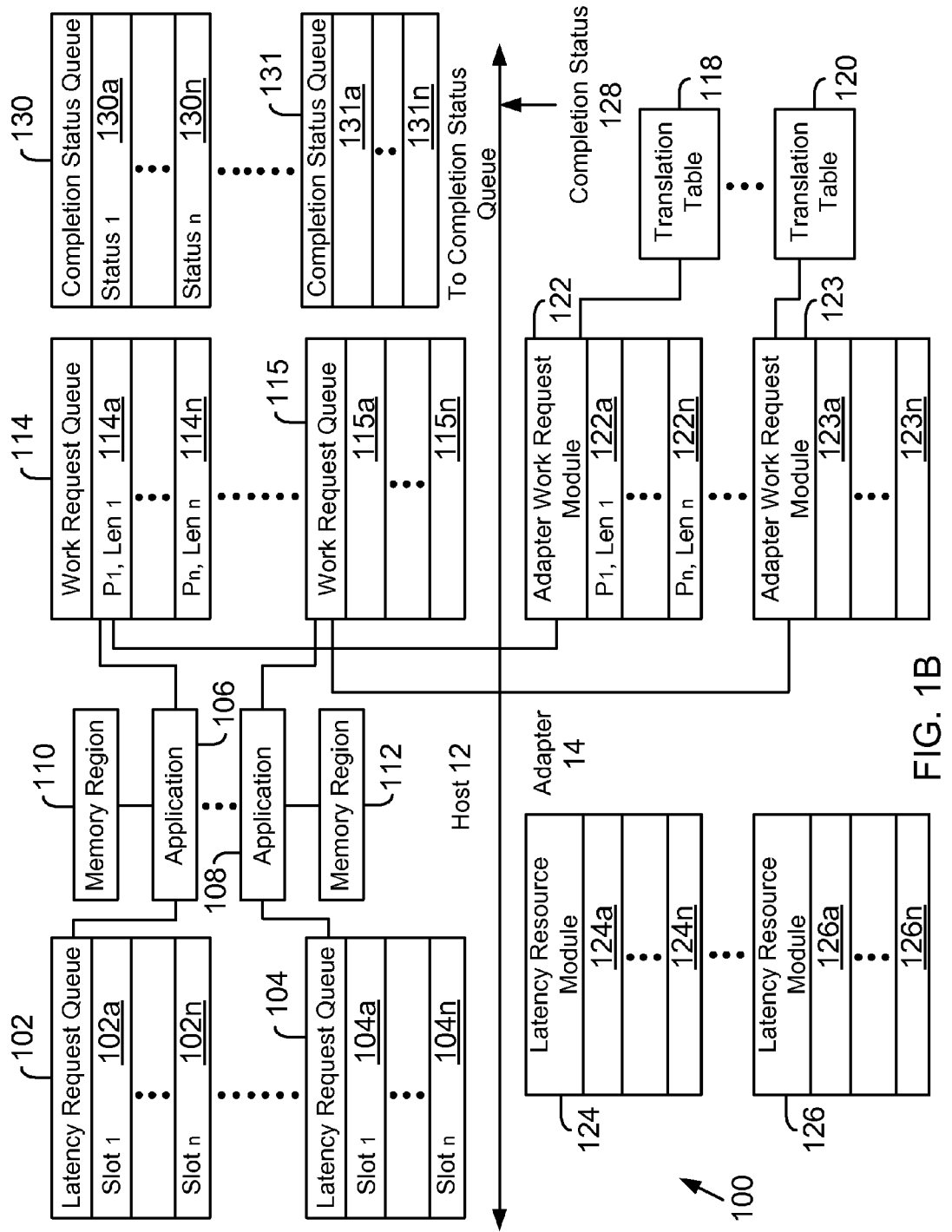
FIG. 1B shows a logical diagram of a system, according to one aspect.

FIG. 1B shows a system 100 for efficiently transmitting information via adapter 14, according to one aspect. Although the term adapter is used to describe the various aspects herein, any device capable of transmitting network information and interfacing with computing system 12 may be used to implement the inventive aspects of the present disclosure, for example, a network interface card, a host bus adapter, a converged host bus adapter and other similar devices.

In one aspect, a plurality of applications, for example, applications 106 and 108 may be executed by host system 12 for sending and receiving information to and from network devices. Applications 106/108 may be email, database or any other application type.

Each application may be assigned a designated memory region, for example, memory region 110 is assigned to application 106 and memory region 112 is assigned to application 108 where information can be placed by host processor 18 as well as adapter 14. The memory regions are located within memory 28 and the applications may each be assigned more than one memory region.

Typically, for each assigned memory region, the adapter maintains a translation table 118/120, which translates application provided virtual addresses referencing the host memory regions 110/112 to their physical addresses in memory 28. These physical addresses can then be used by the adapter 14 to read or write into the application's memory regions.

Each application can create one or more connections to exchange data over the network 50 of FIG. 1A with its counterparts on remote systems. Connections may be based on the Transmission Control Protocol (TCP), Remote Direct Memory Access (RDMA), iSCSI, InfiniBand (IB) or any other protocol. Each connection created by an application is assigned a work request queue, for example, work request queue 114 is assigned to application 106 and work request queue 115 is assigned to application 108. Each work request queue includes a plurality of slots (or locations), for example, 114a-114n and 115a-115n. The slots may be used to store work requests from the assigned application. For example, a work request may be used for sending out a data payload and the work request provides a virtual address P1 at a memory region, for example, 110/112 and a total length (or size) L1 of the intended transfer.

Each connection (and thus work request queue) or application is also assigned one or more completion queues 130/131 where the adapter 14 sends (or posts) completion status for work requests posted by the application. As an example, in the context of a "send" work request, if the application signals in the work request that it wants an associated completion, the adapter's completion status for that specific work request indicates to the application that the "send" source data provided in the work request and referred to as the range P1, L1 in memory region 110/112 has been sent by the adapter and visible to the application's counterpart on the remote machine and thus the memory range is now available for new usage and to hold new data.

Corresponding to each work request queue at host system 12, adapter 14 includes an adapter work request module 122/123. For example, adapter work request module 122 (may be referred to as module 122) corresponds to work request queue 114 and adapter work request module 123 (may be referred to as module 123) corresponds to work request queue 115. Each adapter work request module includes a plurality of slots, for example, 122a-122n and 123a-123n. The slots are used to store the work requests posted by application into work request queues 114/115, for example, (P1, Len1)-(Pn, Lenn), where P1 is a virtual address and Len indicates the length of the payload.

Adapter 14 via a direct memory access (DMA) operation acquires the work request from work request queue 114/115 and places it at a slot of the work request module 122/123. Adapter 14 then obtains the payload location by using a translation table 118 (as described below, by translating application provided virtual address P1 to a physical address into memory 28).

The translation process however, slows down the overall processing of a work request. This can be a challenge in an environment where packets for multiple connections have to processed and transmitted at very high speeds, for example, at 10 gigabits per second (G), 40G or higher speeds. The various aspects disclosed herein provide an alternative of using a latency message for transmitting information that does not have to use the translation table, as described below in more detail.

In one aspect, host system 12 includes a latency request queue 102 that is associated with application 106. A similar latency request queue 104 is associated with application 108. Latency queue 102 may include a plurality of slots 102a-102n, while latency queue 104 includes slots 104a-104n. The latency queue slots are used to store a payload for a latency message. In one aspect, the host latency queue will have a higher number of slots than an adapter based latency module described below (124/126).

The term latency message as used herein means a message (or command that comes over link 30) to send information via link 50 to another network device that does not require the adapter to perform a translation or use a DMA operation to obtain a work request. Instead, the adapter 14 can access the payload directly from a slot of the latency queues 102 and 104 after receiving the latency message directly from the host system.

The adapter 14 also includes latency resource modules for example, 124 and 126 that are each associated with a latency queue. For example, latency resource module 124 is associated with latency queue 102 and latency resource module 126 is associated with latency queue 104. The latency resource modules include slots, for example, 124a-124n and 126a-126n. The slots are used for storing information related to sending out frames over network 50 for the latency message.

Application 106 at host 12 may send a latency message (instead of a regular "send" message via work request queue 114) to adapter 14 when a message size meets a threshold size and a latency resource queue slot is available (e.g. in latency queue 102). The latency message includes a slot number of a latency queue where a payload associated with the message is located and the total length (or size) of the payload. The application copies the payload from its memory region (e.g. 110) referenced by the range P1/L1 into the latency request queue slot prior to this. The latency message (similar to work requests posted in work request queue 114) may also include an indicator or signal as mentioned previously, indicating that the host wants a completion message after the payload is successfully transmitted and/or acknowledged by the destination.

The payload may be located at one of the slots 102a-102n or 104a-104n. A work request is also posted at the work request modules 114/115 so that if the latency message is not accepted by adapter 14, then the work request can be processed via a standard DMA operation.

If the adapter 14 accepts the latency message, then it acquires the payload from the appropriate latency queue slot. A translation table is not used to obtain the message since the adapter latency resource module associated with the work request queue directly stores the memory address of the latency request queue slots. The message is then transmitted to its destination.

Assuming the application requested a completion, Adapter 14 also sends a completion to the host (e.g. in completion queue 130) indicating that the message has been transmitted. The completion queues 130/131 include a plurality of storage locations 130a-130n and 131a-131n, respectively, for storing status messages.

Adapter 14 sends the message without waiting to receive an acknowledgement from the destination, indicating that the message has been properly received (since a copy of the payload is preserved in the latency request queue slot). This allows the application 106 to continue with other tasks and it does not have to wait for a completion status before reusing the source area defined by the range P1/L1.

If adapter 14 does not receive an acknowledgement from the destination, it simply resends the payload from the slot of the latency queue 102/104. The slot that stores the payload at latency queue 102 is not overwritten, until an acknowledgement is received from the destination.

If the latency message indicates that a completion status is needed, then adapter 14 posts a completion status 128. The completion status is stored at a completion status queue 130 or 131 maintained by host system 12.

To support the latency message mechanism, in one aspect, the adapter 14 provides certain information in the completion status, for example, the number of in-use latency resource module slots at the time the completion status was generated (in some aspects, the number of free adapter latency resource slots may also be provided in the completion status, since in-use and free are equivalent pieces of information given that number of latency resource module slots are known). As described below, this enables the application to preserve unacknowledged data in latency request queue slots while allowing it to submit latency messages when free latency request queue slots are available.

Figure 2A:
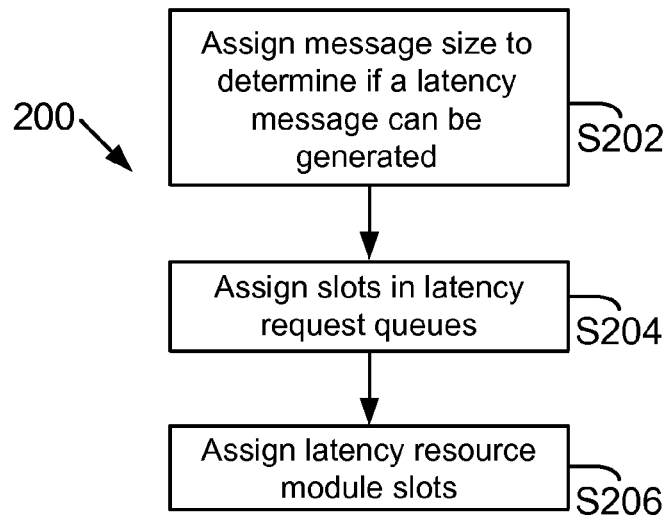
FIGS. 2A-2D are process flow diagrams for using the system of FIG. 1B, according to one aspect.

FIG. 2A shows a configuration process 200 for configuring some of the system 10 components, according to one aspect. The process starts with block S202, when a message size is set to determine whether a latency message can be generated by an application. In one aspect, a single message size may be set. In another aspect, different message sizes may be set for different applications. The message size can be configured using a processor executable management application that provides a user interface (graphical user interface or command line interface) at a display device (not shown). The message size is used by applications 106-108 to determine whether it can generate a latency message. As an example, if the latency message size limit is set to a higher value, the latency request queue slots have a bigger size to accommodate a maximum sized latency payload.

In block S204, slots are assigned at latency request queues 102 and 104. In one aspect, as described above, the latency request queue is dedicated to an application. In another aspect, a latency request queue may be shared among applications. The latency request queues are assigned in memory 28 or at any other location accessible to processor 18.

In block S206, latency resource modules are assigned to the applications at adapter 14. In one aspect, each application has a dedicated latency resource module. In another aspect, a latency resource module is shared among a plurality of applications. After process 200, the system is ready to use latency messages as described below in detail.

Figure 2B:
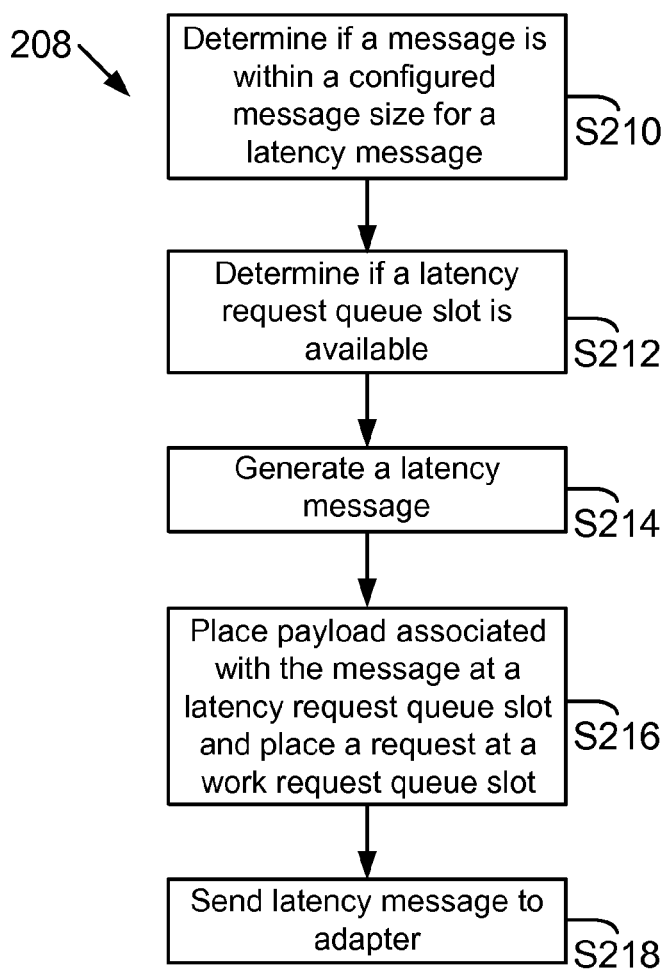

FIG. 2B shows a process 208 for generating a latency message, according to one aspect. The process begins in block S210, when an application executed by host 12 determines if a latency message for a connection can be sent. The application makes the determination based on the message size i.e. if the latency message is within a configured message size. In block S212, the application determines if a latency request queue slot is available for storing message payload. As an example, the latency resource queue slots may be allocated in a particular order (e.g. allocation may be performed in the following order 102a, 102b, . . . 102n, 102a, 102b, . . . 102n and so on). Allocation and release of slots may be intermixed (e.g. allocate-102a, allocate-102b, allocate-102c, release-102a, release-102b, release-102d and so forth).

If the conditions in blocks S210 and S212 are met, then in block S214, a latency message is generated.

In block S216, a payload associated with the latency message is placed at a slot of the latency request queue (by copying the message payload from the application's memory region, as described above). The application also places a work request at a work request queue slot, just in case the adapter does not accept the latency message. Thereafter, the latency message is sent to adapter 14 in block S218.

Figure 2C:
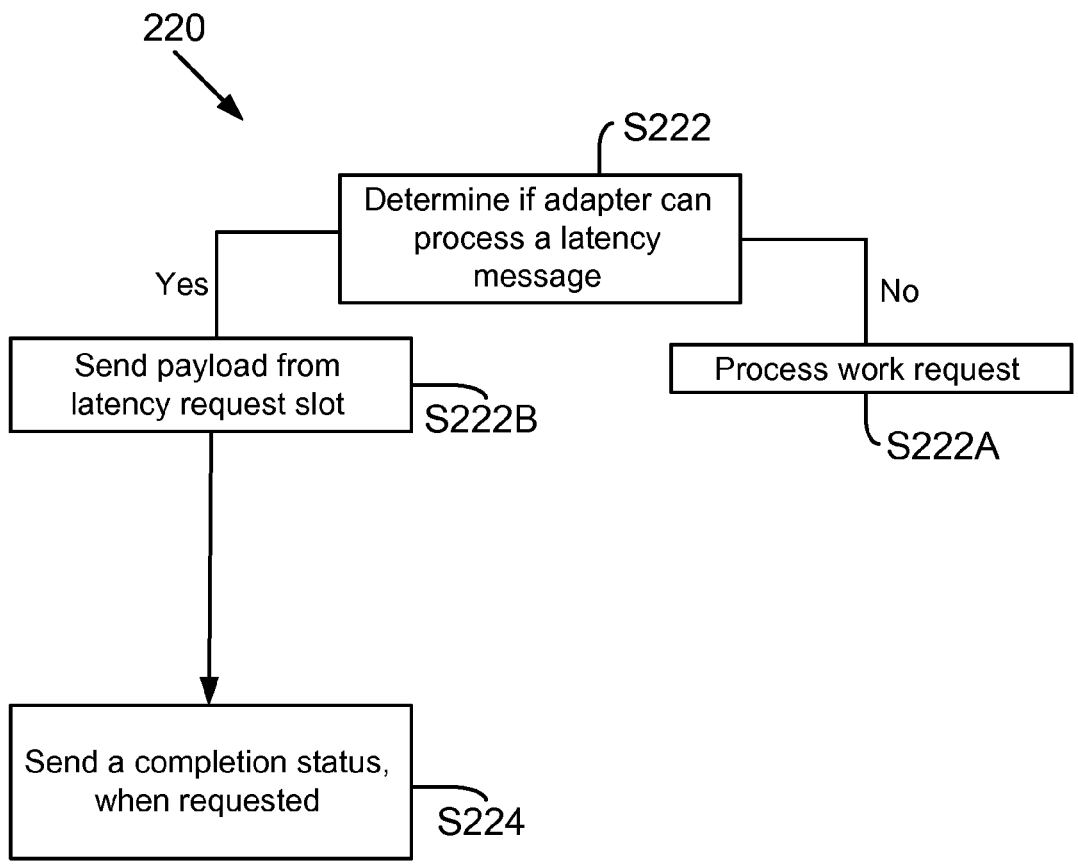

FIG. 2C shows a process 220 for processing the latency message by the adapter 14 sent in block S218 of FIG. 2B, according to one aspect. The process begins in block S222, when the adapter determines if it can process the latency message. The adapter 14 makes this determination based on various considerations, including network traffic, protocol and ordering needs. For example, the adapter 14 determines if any latency resource module slot is available to be used; if the network protocol on link 50 will allow the message's frames to be sent out immediately (as an example, a TCP window may be closed or there may be previous data that has still not been sent out on the connection); if there are previously posted pending regular work requests for which all frames have yet to be sent out and other factors. If the latency message cannot be processed, then in block S222A, adapter 14 processes the associated work request in the work request queue slot.

If the latency message can be processed by adapter 14, then the payload is acquired from the latency request queue slot in block S222B. The associated adapter latency resource module slot is updated, networking protocol headers (for example, MAC (Media Access Control), IP (Internet Protocol), TCP, RDMA headers) and trailers (e.g. checksum, CRC (cyclic redundancy code) and others) are added, and the frame is scheduled for transmission and transmitted at an appropriate time.

If a completion status is requested for the latency message, as indicated by the application, then in block S224, adapter 14 sends the completion status 128 immediately without waiting for an acknowledgement of receipt of recently transmitted frame to be received from the destination. This is possible because if the networking protocol determines that remote destination has not received or acknowledged the data in timely manner, adapter 14 can resend the frame from the saved payload in host latency resource queue slot and saved headers in adapter latency resource module slot, none of which are freed till the data receipt is acknowledged.

Figure 2D:
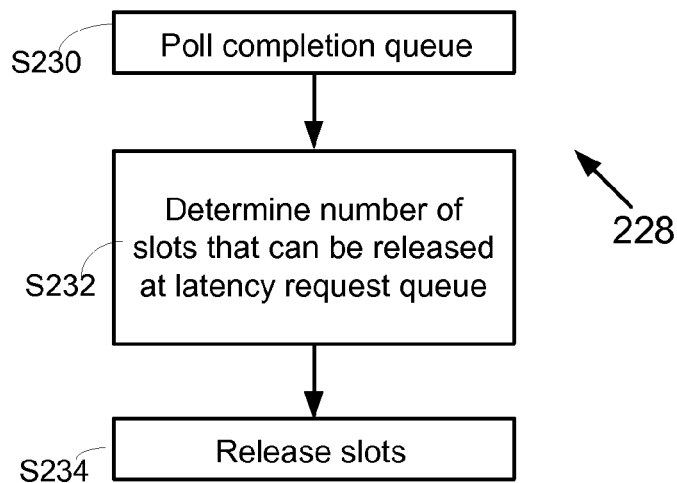

FIG. 2D shows a process 228 for releasing slots at latency request queue 102 and 104 and latency resource modules 124 and 126, respectively, according to one aspect. The slots are released so that applications can continue to send latency messages.

As described above, the slots in latency resource modules 124 and 126 are used to store connection state information, for example, frame headers for MAC, TCP/IP and other protocols, when used. Each slot is associated with the payload bearing slots in latency request queue 102 and 104. The latency resource module slots are released when an acknowledgment is received from a packet destination by the adapter 14. This allows the application to release the associated latency request queue slots as described below in detail.

The process 228 begins in block S230, when an application polls a completion queue. For example, application 106 polls the completion queue 130 to ascertain if there are any completion status messages that have not been processed. Thereafter, in block S232, the application determines the number of slots it can release. The following provides an example for releasing a slot, according to one aspect. As an example, the slots may be released in a same order that the slots were allocated.

Assume that a series of messages P1, P2, P3/C, P4, P5/C, P6, P7, P8/C, P9 and P10 are posted by the host system 12 for adapter 14. The messages that need a completion status may be identified by /C. Some of these messages may be latency messages, and some may be normal messages, but all of them are represented in a host work request queue (e.g. 114) in successive slots (e.g. P1 may be in 114a, P2 in 114b, P8 in 114h and so forth). The number of latency messages between messages that are marked with completion (by /C in this example) are tracked by the application in the work request queue slots 114a-n. For example, if P6 and P7 are latency messages and P8 is a regular post, the work queue slot for P8 (i.e. 114h) would save the information that two latency messages have been posted. When completion queue (e.g. 130) is polled, completion status is expected for messages marked for completion (i.e. three successive completions for P3, P5 and P8 are expected). In one aspect, the application may use a counter (not shown) to track the number of latency messages and the number of messages that are marked for completion.

As mentioned above, each completion status will carry information provided by adapter 114 to indicate how many of the associated latency resource module slots are in-use when the completion is generated. Continuing with the foregoing example, assume that the completion for P5 indicated N5 latency module slots were in-use, and completion for P8 indicated N8 latency module slots were in-use. Now, if there are no latency messages between P5/C and P8/C, then N5-N8 slots can be released in latency resource module 124/126 between the time the two completions were generated. Now, if there are L latency messages in the P6,P7,P8 sequence as saved in the work request queue slot for P8 i.e. 114h, then L+N5-N8 slots were released by the adapter. Based on the number of latency resource module slots that were released on the adapter, the host application determines the number of latency request queue slots that can be released on the host as well. Thereafter, in block S234, the application releases the slots at latency request queue.

The various aspects of the present disclosure have advantages of over conventional systems, where translation tables are used. The latency message mechanism expedites transmission and processing of network information.

Although the present disclosure has been described with reference to specific aspects (or embodiments), these aspects are illustrative only and not limiting. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine implemented method, comprising:

configuring a threshold message size to determine when an application executed by a computing system can send latency messages to a device coupled to the computing system, the latency messages identifying memory locations of a latency request queue at a memory of the computing system from where the device can directly procure data for transmission to a destination without having to first obtain a work request from the memory of the computing system using a direct memory access (DMA) operation;

generating a latency message by the application when the latency message meets the threshold message size for a network connection to transmit a payload associated with the latency message;

storing the payload at a slot of the latency request queue;

placing a work queue request at a work queue slot at the memory of the computing system, wherein the work queue request corresponds to the latency message and is placed by the application in case processing of the latency message is rejected by the device and instead the work queue request is obtained by the device using the DMA operation before transmitting the payload;

sending the latency message to the device, where the latency message includes an address of the slot of the latency request queue where the payload is stored, a transfer size for the network connection, and an indicator indicating if the application wants a completion status after the latency message is processed;

determining by the device whether it can process the latency message;

obtaining the payload from the slot of the latency request queue, when the device can process the latency message;

storing the payload and connection information at a memory location of a memory of the device dedicated to the application that sends the latency message to the device;

transmitting the payload to the destination using the network connection;

and posting a completion status, if one is requested by the application; wherein the device posts the completion status at a completion queue at the memory of the computing system associated with the application with information that enables the application to determine whether other latency messages can be posted at the latency request queue.

2. The method of claim 1, wherein the latency request queue having a plurality of slots is assigned to the application.

3. The method of claim 1, wherein a latency resource module having a plurality of slots is assigned to the application at the device to store the payload retrieved from the latency request queue.

4. The method of claim 3, wherein one or more of the slots for the latency resource module are used to store the connection information.

5. The method of claim 2, wherein the application polls the completion queue to determine which slots of the latency request queue can be released for storing new payload for other latency messages.

6. The method of claim 1, wherein the work request queue is assigned to the application so that the payload is transmitted using the work request instead of the latency message, if the device does not accept the latency message.

7. The method of claim 1, wherein the device is one of a network interface card, a converged adapter and a host bus adapter coupled to the computing system for sending and receiving data on behalf of the application.

8. A non-transitory, machine readable storage medium storing executable instructions, which when executed by a machine, causes the machine to perform a method, the method comprising:

configuring a threshold message size to determine when an application executed by a computing system can send latency messages to a device coupled to the computing system, the latency messages identifying memory locations of a latency request queue at a memory of the computing system from where the device can directly procure data for transmission to a destination without having to first obtain a work request from the memory of the computing system using a direct memory access (DMA) operation;

generating a latency message by the application when the latency message meets the threshold message size for a network connection to transmit a payload associated with the latency message;

storing the payload at a slot of the latency request queue;

placing a work queue request at a work queue slot at the memory of the computing system, wherein the work queue request corresponds to the latency message and is placed by the application in case processing of the latency message is rejected by the device and instead the work queue request is obtained by the device using the DMA operation before transmitting the payload;

sending the latency message to the device, where the latency message includes an address of the slot of the latency request queue where the payload is stored, a transfer size for the network connection, and an indicator indicating if the application wants a completion status after the latency message is processed;

determining by the device whether it can process the latency message;

obtaining the payload from the slot of the latency request queue, when the device can process the latency message;

storing the payload and connection information at a memory location of a memory of the device dedicated to the application that sends the latency message to the device;

transmitting the payload to the destination using the network connection;

and posting a completion status, if one is requested by the application; wherein the device posts the completion status at a completion queue at the memory of the computing system associated with the application with information that enables the application to determine whether other latency messages can be posted at the latency request queue.

9. The storage medium of claim 8, wherein the latency request queue having a plurality of slots is assigned to the application.

10. The storage medium of claim 8, wherein a latency resource module having a plurality of slots is assigned to the application at the device to store the payload retrieved from the latency request queue.

11. The storage medium of claim 10, wherein one or more of the slots for the latency resource module are used to store the connection information.

12. The storage medium of claim 9, wherein the application polls the completion queue to determine which slots of the latency request queue can be released for storing new payload for other latency messages.

13. The storage medium of claim 8, wherein the work request queue is assigned to the application so that the payload is transmitted using the work request instead of the latency message, if the device does not accept the latency message.

14. The storage medium of claim 8, wherein the device is one of a network interface card, a converged adapter and a host bus adapter coupled to the computing system for sending and receiving data on behalf of the application.

15. A system, comprising:

a computing system having a processor for executing instructions out of a memory and interfacing with a device having a device processor executing instructions out of a device memory;

wherein a threshold message size is configured to determine when an application executed by the computing system processor can send latency messages to the device identifying memory locations of a latency request queue at the memory of the computing system from where the device can directly procure data for transmission to a destination without having to first obtain a work request from the memory of the computing system using a direct memory access (DMA) operation;

wherein the application generates a latency message when the latency message meets the threshold message size for a network connection to transmit a payload associated with the latency message; stores the payload at a slot of the latency request queue and places a work queue request at a work queue slot at the memory of the computing system, wherein the work queue request corresponds to the latency message and is placed by the application in case processing of the latency message is rejected by the device and instead the work queue request is obtained by the device using the DMA operation before transmitting the payload wherein the computing system sends the latency message to the device, where the latency message includes an address of the slot of the latency request queue where the payload is stored, a transfer size for the network connection, and an indicator indicating if the application wants a completion status after the latency message is processed; and the computing system stores connection information at a location dedicated to the application that sends the latency message; and wherein the device determines whether it can process the latency message, obtains the payload from the slot of the latency request queue, when the device can process the latency message, stores the payload at memory location of the device memory dedicated to the application, transmits the payload to the destination using the network connection; and posts a completion status, if one is requested by the application; where the device posts the completion status at a completion queue associated with the application with information that enables the application to determine whether other latency messages can be posted at the latency request queue.

16. The system of claim 15, wherein the latency request queue having a plurality of slots is assigned to the application.

17. The system of claim 15, wherein a latency resource module having a plurality of slots is assigned to the application at the device to store the payload retrieved from the latency request queue.

18. The system of claim 17, wherein one or more of the slots for the latency resource module are used to store the connection information.

19. The system of claim 16, wherein the application polls the completion queue to determine which slots of the latency request queue can be released for storing new payload for other latency messages.

20. The system of claim 15, wherein the work request queue is assigned to the application so that the payload is transmitted using the work request instead of the latency message, if the device does not accept the latency message.

21. The system of claim 15, wherein the device is one of a network interface card, a converged adapter and a host bus adapter coupled to the computing system for sending and receiving data on behalf of the application.

* * * * *

UNITED STATES PATENT AND TRADEMARK OFFICE
CERTIFICATE OF CORRECTION

PATENT NO. : 9,936,003 B1
APPLICATION NO. : 14/473524
DATED : April 3, 2018
INVENTOR(S) : Kanoj Sarcar Page 1 of 1

It is certified that error appears in the above-identified patent and that said Letters Patent is hereby corrected as shown below:

In Column 5, Line 25, after "adapter" insert -- 14 --, therefor.

Signed and Sealed this
Twenty-sixth Day of June, 2018

Andrei Iancu
*Director of the United States Patent and Trademark Office*